(12) United States Patent
Sakamoto et al.

(10) Patent No.: US 7,517,436 B2
(45) Date of Patent: Apr. 14, 2009

(54) MAGNETO-OPTICAL RECORDING MEDIUM AND MANUFACTURING METHOD THEREOF

(75) Inventors: Tetsuhiro Sakamoto, Tokyo (JP); Kazutomo Miyata, Miyagi (JP)

(73) Assignee: Sony Corporation, Tokyo (JP)

( * ) Notice: Subject to any disclaimer, the term of this patent is extended or adjusted under 35 U.S.C. 154(b) by 89 days.

(21) Appl. No.: 10/476,628

(22) PCT Filed: Mar. 12, 2003

(86) PCT No.: PCT/JP03/02910

§ 371 (c)(1),
(2), (4) Date: Mar. 29, 2004

(87) PCT Pub. No.: WO03/077245

PCT Pub. Date: Sep. 18, 2003

(65) Prior Publication Data

US 2004/0157087 A1     Aug. 12, 2004

(30) Foreign Application Priority Data

Mar. 14, 2002   (JP)   ............... 2002-070375

(51) Int. Cl.
*C23C 14/34* (2006.01)
(52) U.S. Cl. ............... 204/192.2; 204/192.15; 204/192.12
(58) Field of Classification Search .............. 204/192.2, 204/192.26, 192.15, 192.12
See application file for complete search history.

(56) References Cited

U.S. PATENT DOCUMENTS

| | | | | |
|---|---|---|---|---|
| 4,576,699 A | * | 3/1986 | Sato et al. .............. | 204/192.26 |
| 5,563,852 A | * | 10/1996 | Murakami et al. .......... | 428/820 |
| 5,814,400 A | * | 9/1998 | Kirino et al. ................ | 428/332 |
| 6,033,535 A | * | 3/2000 | Ohno et al. .............. | 204/192.2 |
| 6,054,024 A | * | 4/2000 | Toyama et al. ......... | 204/192.29 |
| 6,388,956 B1 | | 5/2002 | Mori et al. | |
| 6,545,955 B1 | | 4/2003 | Iwata et al. | |

FOREIGN PATENT DOCUMENTS

| | | |
|---|---|---|
| EP | 0 619 577 A1 | 10/1994 |
| EP | 1 315 159 A2 | 5/2003 |
| JP | 63-127450 | 5/1988 |
| JP | 03-142732 | 6/1991 |

(Continued)

OTHER PUBLICATIONS

Honda et al., "Change of Magnetic Properties in Compositionally Modulated TbCo Sputtered Films", IEEE Transactions On Magnetics, vol. Mag-22, No. 5, Sep. 1986, pp. 1221-1223.*

(Continued)

*Primary Examiner*—Rodney G McDonald
(74) *Attorney, Agent, or Firm*—Robert J. Depke; Rockey, Depke & Lyons, LLC

(57) ABSTRACT

In a manufacturing method of a magneto-optical recording medium formed by laminating a plurality of magnetic layers, there is provided a manufacturing method whereby at least two of the magnetic layers can be properly and individually formed by sputtering the same target means in the same vacuum vessel under different conditions at the time of a sputtering process in accordance with an element composition ratio and/or magnetic characteristics of each layer.

15 Claims, 5 Drawing Sheets

FOREIGN PATENT DOCUMENTS

| | | | |
|---|---|---|---|
| JP | 05-217232 | * | 8/1993 |
| JP | 5-217232 A | | 8/1993 |
| JP | 05-303777 | | 11/1993 |
| JP | 05-314559 | * | 11/1993 |
| JP | 5-314559 A | | 11/1993 |
| JP | 05-3037777 | | 11/1993 |
| JP | 5-325283 A | | 12/1993 |
| JP | 6-295479 A | | 10/1994 |
| JP | 11-213466 | | 8/1999 |
| JP | 2000-163814 A | | 6/2000 |
| JP | 2001-043579 | | 2/2001 |
| JP | 2003-162848 A | | 6/2003 |
| WO | WO 01/93259 A1 | | 12/2001 |

OTHER PUBLICATIONS

Machine Translation of 05-314559, 05-217232.*

* cited by examiner

21 MAGNETOOPTIC DISK

31 MAGNETOOPTIC DISK

MAGNETO-OPTICAL RECORDING MEDIUM AND MANUFACTURING METHOD THEREOF

This application claims priority to Japanese Patent Application Number JP2002-070375, filed Mar. 14, 2002, which is incorporated herein by reference.

TECHNICAL FIELD

The invention relates to a magneto-optical recording medium and its manufacturing method and, for example, to a magneto-optical recording medium having a plurality of magnetic layers and its manufacturing method.

BACKGROUND ART

A magnetooptic disk in which a medium surface is heated by using a laser beam and the direction of magnetization is changed by applying a magnetic field to the surface, thereby recording digital data has been put into practical use.

In recent years, a request for a magnetooptic disk of a low cost in which digital data of a larger capacity can be recorded has been rising. To satisfy such a request, there have been proposed magnetooptic disks of an MSR (Magnetically induced Super Resolution) system such as a DWDD (Domain Wall Displacement Detection) system having a multilayer film structure in which a plurality of magnetic layers have been laminated and the like. Those magnetooptic disks have an advantage such that, in principle, linear recording density can be much increased without being limited by a wavelength of the laser beam or a Numerical Aperture (NA) of an objective lens.

As a manufacturing method of those magnetooptic disks, a manufacturing method of sequentially laminating a plurality of magnetic layers onto one principal plane of a substrate by using a single wafer type sputtering apparatus has been examined.

However, the manufacturing method of laminating the magnetic layers onto one principal plane of the substrate by using the single wafer type sputtering apparatus has a problem such that since the number of sputtering processing vessels increases, manufacturing facilities become complicated and increase in size.

There is also a problem such that the increase in number of sputtering processing vessels causes an increase in manufacturing costs and a tact time of the magnetooptic disks.

If the number of magnetic layers is decreased to solve those problems, deterioration of signal characteristics is caused. It is because, in the magnetooptic disks of the MSR system such as a magnetically amplified detection system or the like, it is indispensable to increase the number of magnetic layers in order to realize the high-quality signal characteristics of high-density recording and reproduction which are independent of an optical system.

DISCLOSURE OF INVENTION

It is an object of the invention to provide a magneto-optical recording medium and its manufacturing method by which manufacturing facilities can be simplified and miniaturized.

Another object of the invention is to provide a magneto-optical recording medium and its manufacturing method by which manufacturing costs and a tact time can be reduced.

To accomplish the above objects, according to the first invention of the present invention, there is provided a manufacturing method of a magneto-optical recording medium whereby a recording film constructed by laminating a plurality of magnetic layers is formed onto one principal plane of a substrate by sputtering, comprising the steps of:

forming at least two of the plurality of magnetic layers by sputtering same target means in a same vacuum vessel; and in accordance with an element composition ratio and/or magnetic characteristics of each of the at least two layers, selecting processing conditions at the time of a sputtering process which is different in each of the at least two layers.

In the first invention of the present invention, typically, the target means is an alloy target or a plurality of targets.

According to the second invention of the present invention, there is provided a magneto-optical recording medium in which a recording film formed by laminating a plurality of magnetic layers is formed on one principal plane of a substrate, wherein at least two of the plurality of magnetic layers consist of same component elements and have different element composition ratios and/or magnetic characteristics.

According to the invention, when the at least two of the plurality of magnetic layers which the magneto-optical recording medium has are formed by sputtering the same target means in the same vacuum vessel, since the processing conditions at the time of the sputtering process are selected in accordance with the element composition ratio and/or the magnetic characteristics of each layer, the magnetic layers can be properly and individually formed merely by changing the processing conditions at the time of the sputtering process.

BEST MODE FOR CARRYING OUT THE INVENTION

Figure 1:
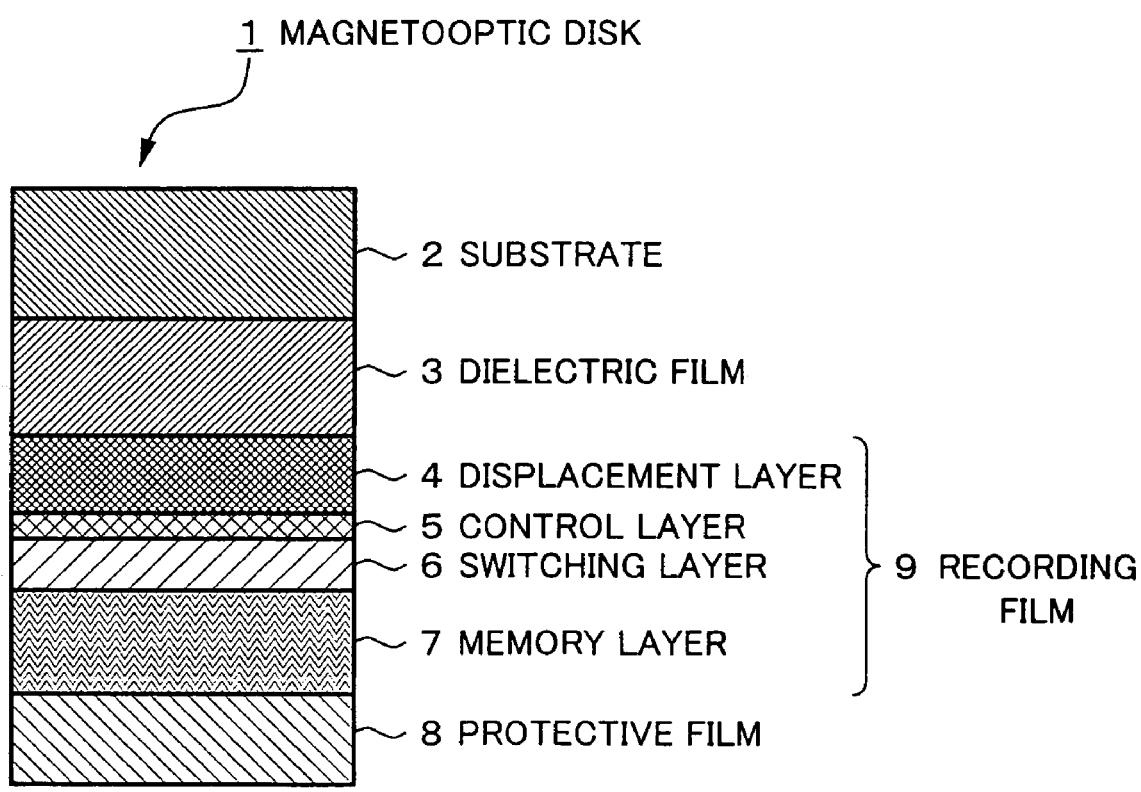
FIG. 1 is a cross sectional view showing an example of a construction of a magnetooptic disk according to an embodiment of the invention.

An embodiment of the invention will be described hereinbelow with reference to the drawings. FIG. 1 is a cross sectional view showing an example of a construction of a magnetooptic disk 1 according to an embodiment of the invention. As shown in FIG. 1, the magnetooptic disk 1 according to the embodiment of the invention is constructed by sequentially laminating a dielectric film 3, a recording film 9, and a protective film 8 onto one principal plane of a substrate 2. The recording film 9 is constructed by sequentially laminating a displacement layer 4, a control layer 5, a switching layer 6, and a memory layer 7 onto the dielectric film 3. The magnetooptic disk 1 is, for example, a magnetooptic disk of what is called a Domain Wall Displacement Detection system in which a magnetic domain is enlarged and/or reduced by using temperature distribution of the recording film near a laser spot and a change in domain area is detected as information.

The substrate 2 is made of a resin material molded into a disk shape by, for example, injection molding. For example, polycarbonate resin or the like is used as a resin material. When the substrate 2 is injection molded, lands and grooves are formed, for example, in a spiral shape onto one principal plane of the substrate 2 by a stamper having concave and convex patterns.

The dielectric film 3 formed on one principal plane of the substrate 2 consists of, for example, SiN. The displacement layer 4 formed on the dielectric film 3 consists of, for example, GdFeCoAl.

The control layer 5 formed on the displacement layer 4 consists of the same component elements as those of the switching layer 6, for example, TbFeCoAl. However, the control layer 5 is a magnetic layer having an element composition ratio and/or magnetic characteristics which are different from those of the switching layer 6.

The switching layer 6 formed on the control layer 5 consists of the same component elements as those of the control layer 5, for example, TbFeCoAl.

The memory layer 7 formed on the switching layer 6 consists of, for example, TbFeCo. The protective film 8 formed on the memory layer 7 is used to protect the memory layer 7 and consists of, for example, SiN.

Subsequently, a manufacturing method of the magnetooptic disk 1 constructed as mentioned above will be described. First, a magnetron sputtering apparatus for manufacturing the magnetooptic disk 1 will be described.

Figure 2A:
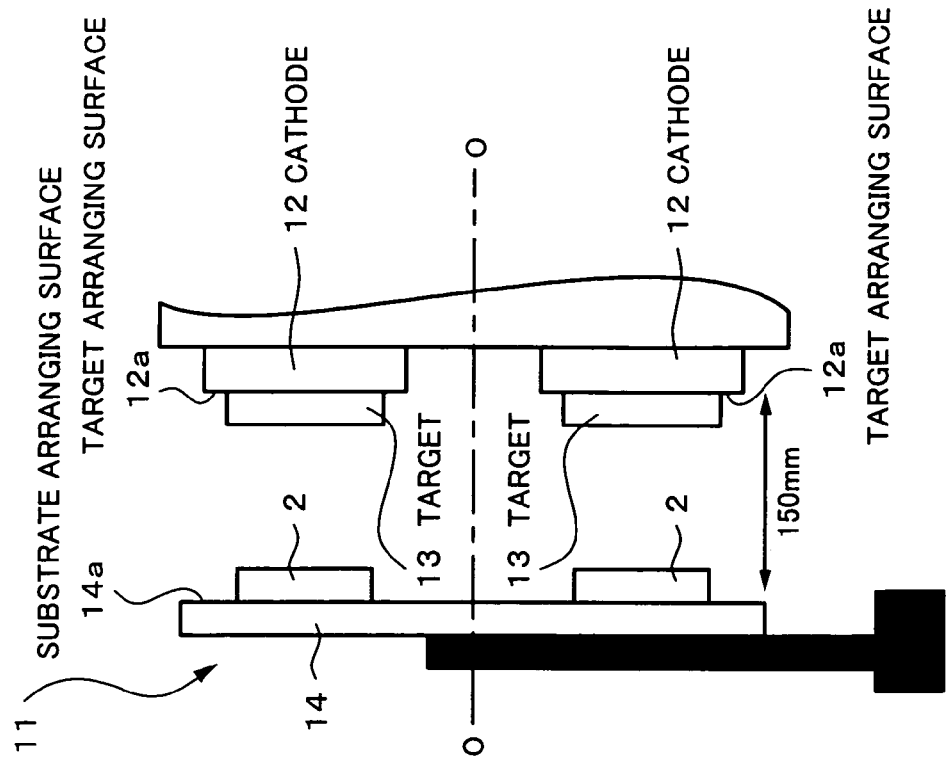
FIG. 2 is a schematic diagram showing an example of a construction of a magnetron sputtering apparatus for manufacturing the magnetooptic disk according to the embodiment of the invention.
Figure 2B:
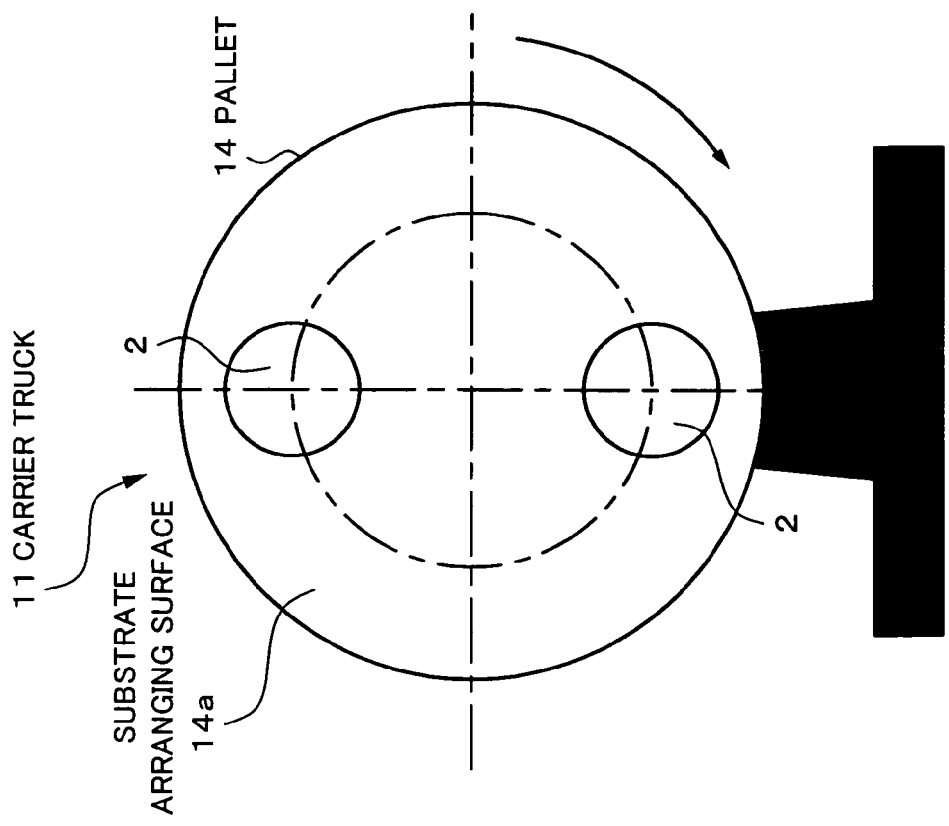

FIG. 2A is a front view of a carrier truck 11 of the magnetron sputtering apparatus. FIG. 2B is a cross sectional view of the magnetron sputtering apparatus. As shown in FIG. 2B, the magnetron sputtering apparatus has the carrier truck 11 for mounting the substrates 2 and a plurality of cathodes 12. The cathodes 12 are arranged so that a center of each cathode is located at a position which is away from a center axis O-O by the same distance and distances between the adjacent cathodes 12 are set to an equal interval. A target 13 is arranged onto a target arranging surface 12a of each cathode 12. Specifically speaking, a Gd target, a Tb target, an Fe target, an FeCo ($Fe_{70}Co_{30}$) alloy target, an Al target, and an Si target are arranged onto the target arranging surfaces 12a of the cathodes 12, respectively. An outer diameter of the target 13 is equal to 15.24 cm (6 inches).

As shown in FIG. 2A, the carrier truck 11 has a disk-shaped pallet 14 constructed so as to be rotatable. The pallet 14 is constructed so that a plurality of substrates 2 can be attached onto a substrate arranging surface 14a. The substrates 2 are arranged onto the substrate arranging surface 14a in a manner such that distances between a center of each substrate 2 and a center of the pallet 14 are set to an equal distance and distances between the adjacent substrates 2 are set to an equal interval. The distance between the center of the pallet 14 and the center of the substrate 2 is almost equal to the distance between the center axis O-O and the center of the cathode 12.

Upon sputtering, the carrier truck 11 is arranged so that the substrate arranging surface 14a faces the target arranging surfaces 12a and the center axis O-O passes through the center of the pallet 14. That is, upon sputtering, the pallet 14 rotates in the plane which is parallel with the target arranging surfaces 12a by using the center axis O-O as a rotational axis. A distance between the substrate arranging surface 14a of the pallet 14 and the target arranging surfaces 12a upon sputtering is equal to 150 mm.

To make understanding of the manufacturing method of the magnetooptic disk 1 according to the embodiment of the invention easy, manufacturing methods of samples 1 and 2 each constructed by sequentially laminating the substrate, dielectric film, magnetic layers, and protective film onto one principal plane of the substrate will now be shown. Between the samples 1 and 2, the processing conditions at the time of the sputtering process for forming the magnetic layers are different.

The processing conditions at the time of the sputtering process will be described. A gas pressure denotes a value of a pressure in the vessel upon sputtering. It is a value which is determined by a volume of the vessel, a gas flow rate, conductance of an exhaust port, a displacement of a pump, and the like and is a value which is highly dependent on the gas flow rate, a numerical aperture of the exhaust port, and the like disclosed in claims. Density distribution of the elements, in the magnetic layer, constructing the magnetic layer denotes that, for example, in the case where there is a magnetic layer whose compositions to represent it are expressed by $Tb_{20}Fe_{68}Co_{12}$, a state where the elements are almost evenly distributed in the magnetic layer and a state where the elements are distributed like layers such as several Tb atom layers and several Fe and Co alloy atom layers are differentiated in terms of density distribution. Those states can be properly and individually formed in accordance with the sputtering conditions.

First, a manufacturing method of the sample 1 will be explained.

First, the substrates are attached onto the substrate arranging surface 14a of the carrier truck 11 shown in FIGS. 2A and 2B and the carrier truck 11 is conveyed into a chamber vessel. The inside of the chamber vessel is vacuum exhausted to $5 \times 10^{-5}$ Pa or less. After that, argon gas and nitrogen are supplied into the chamber vessel, the pallet 14 is rotated while keeping a pressure in the chamber vessel at 0.10 Pa, and an Si target is reactive-sputtered, thereby forming a dielectric film of about 35 nm consisting of SiN onto one principal plane of the substrate. In this instance, a ratio of flow rates of argon and nitrogen is equal to 4:1.

Subsequently, by discharging each target of Tb, Fe, FeCo alloy, and Al and executing sputtering, a magnetic layer of about 40 nm consisting of TbFeCoAl is formed on the dielectric film.

Processing conditions in the sputtering process are shown below. A gas flow rate and a numerical aperture of an exhaust valve are values used in the sputtering apparatus used in the embodiment in the present specification. Since it is not that a desired gas pressure is always obtained when those values are used, they are shown in ( ) as reference values.

Gas pressure: 0.06 Pa
  (gas flow rate: 60 sccm, numerical aperture of exhaust valve: 100%)
Gas type: argon gas
Discharge power (inputted electric power): Tb target 75 W, Fe target 180 W, FeCo alloy target 60 W, and Al target 80 W
Bias voltage to the substrate: 0V
Density distribution of the elements, in the magnetic layer, constructing the magnetic layer: uniform
Distance between the substrate and the target: 150 mm
Rotational speed of the pallet: 1.3 rps (80 rpm)

Subsequently, the argon gas and nitrogen are supplied into the chamber vessel, the pallet 14 is rotated while keeping the pressure in the chamber vessel at 0.10 Pa, and the Si target is reactive-sputtered, thereby forming a protective film consisting of SiN onto the magnetic layer. In this instance, the ratio of the flow rates of argon and nitrogen is equal to, for example, 4:1.

A temperature change of a coercive force of the magnetic layer formed as mentioned above is measured. A measuring apparatus using a Kerr effect is used for such measurement.

Figure 3:
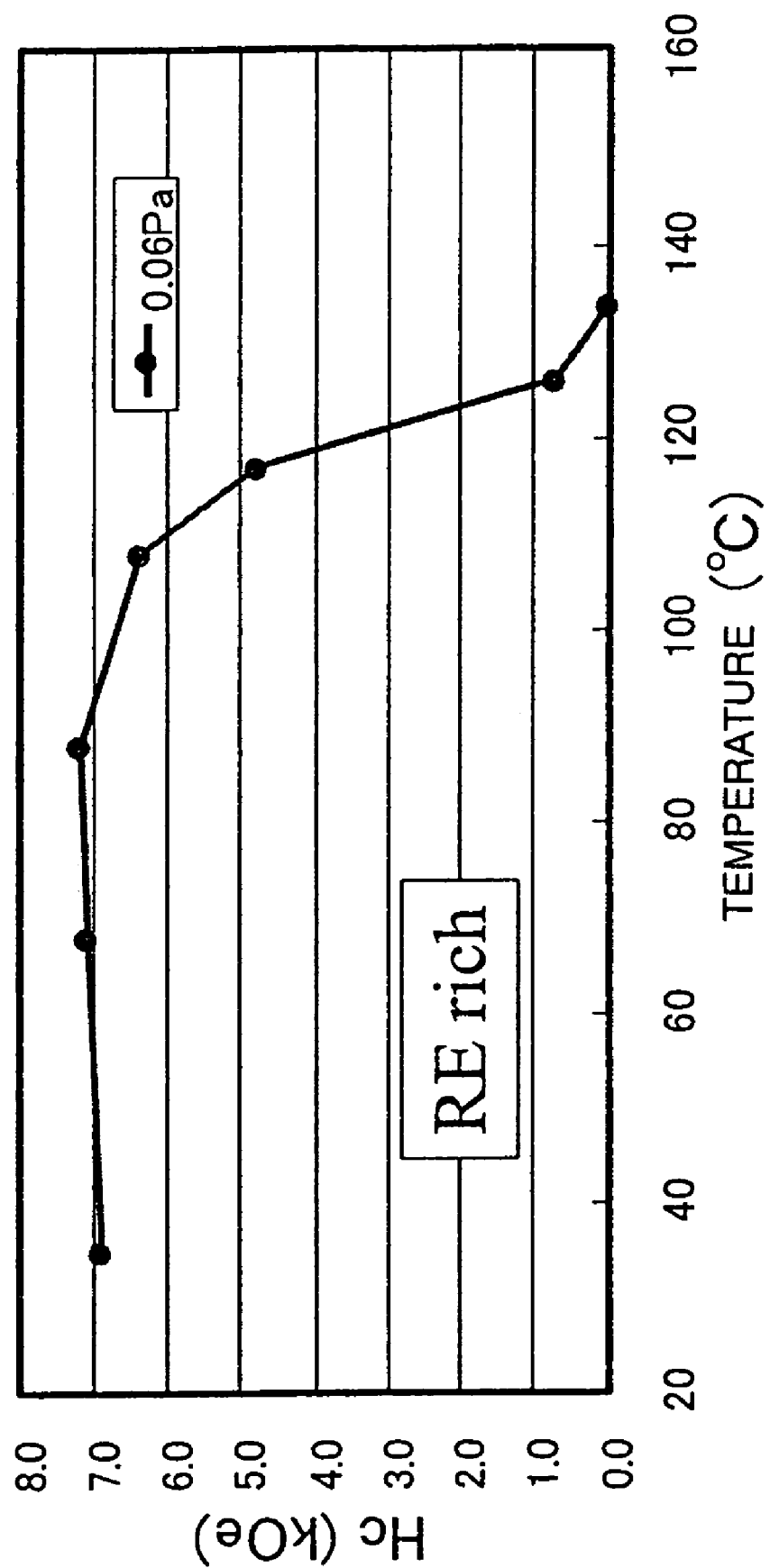
FIG. 3 is a graph showing magnetic characteristics of a magnetic layer of a sample 1.

FIG. 3 is a graph showing the temperature change of the coercive force of the magnetic layer. A temperature at which the coercive force is equal to 0 (almost the same as a Curie temperature) is equal to 134° C. In a temperature range from room temperature to the temperature (134° C.) at which the coercive force is equal to 0, between rare earth (Tb)—transition metals (Fe, Co) of the magnetic layer, the rare earth shows superior magnetization.

Subsequently, the manufacturing method of the sample 2 will be described.

First, a dielectric film of about 35 nm consisting of SiN is formed on the substrate in a manner similar to the manufacturing method of the sample 1.

Subsequently, by discharging each target of Tb, Fe, FeCo alloy, and Al and executing sputtering, a magnetic layer of about 40 nm consisting of TbFeCoAl is formed on the dielectric film.

Processing conditions in the sputtering process are shown below. Processing conditions other than the gas pressure in the sputtering process are similar to those in the case where the magnetic layer of the sample 1 mentioned above is formed.

Gas pressure: 0.34 Pa
(gas flow rate: 100 sccm, numerical aperture of exhaust valve: 45%)
Gas type: argon gas
Discharge power (inputted electric power): Tb target 75 W, Fe target 180 W, FeCo alloy target 60 W, and Al target 80 W
Bias voltage to the substrate: 0V
Density distribution of the elements, in the magnetic layer, constructing the magnetic layer: uniform
Distance between the substrate and the target: 150 mm
Rotational speed of the pallet: 1.3 rps (80 rpm)

Subsequently, a protective film consisting of SiN is formed onto the magnetic layer in a manner similar to the manufacturing method of the sample 1.

A temperature change of a coercive force of the magnetic layer formed as mentioned above is measured. The measuring apparatus using the Kerr effect is used for such measurement.

Figure 4:
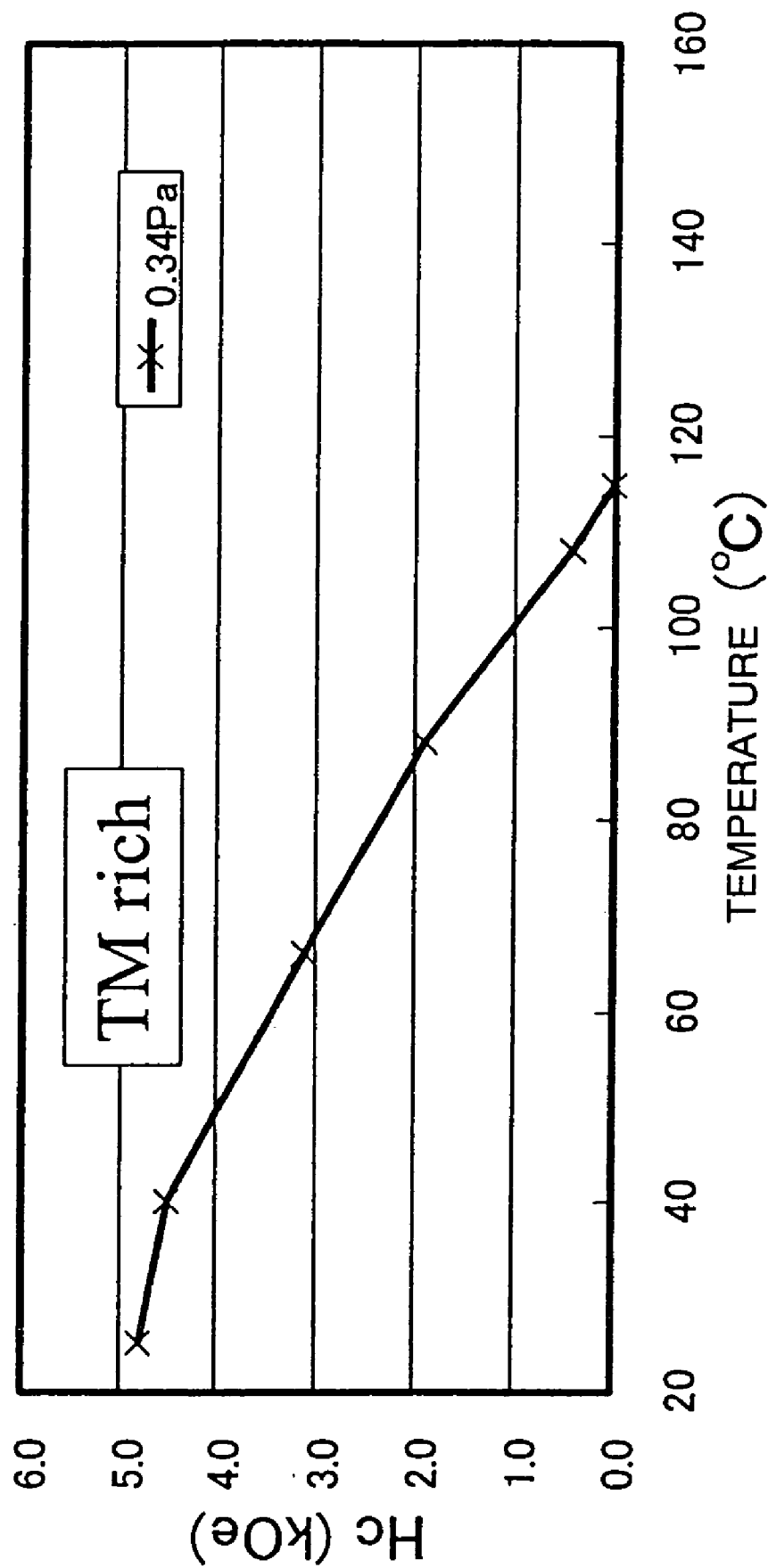
FIG. 4 is a graph showing magnetic characteristics of a magnetic layer of a sample 2.

FIG. 4 is a graph showing the temperature change of the coercive force of the magnetic layer. A temperature at which the coercive force is equal to 0 (almost the same as a Curie temperature) is equal to 115° C. In a temperature range from the room temperature to the temperature (115° C.) at which the coercive force is equal to 0, between the rare earth (Tb)—the transition metals (Fe, Co) of the magnetic layer, the transition metals show the superior magnetization.

According to the manufacturing methods of the samples 1 and 2 mentioned above, in the sputtering using the same targets, by changing the gas pressure as a processing condition of the sputtering process, the magnetic layers of the different values of the coercive force associated with the temperature change can be properly and individually formed as shown in FIGS. 3 and 4.

The manufacturing method of the magnetooptic disk 1 according to the embodiment of the invention will be described hereinbelow. A case where when the same target is sputtered, by changing only the gas pressure as a processing condition of the sputtering process, the displacement layer 4 and the control layer 5 of the magnetooptic disk 1 are properly and individually formed is shown here as an example.

First, the substrates 2 are attached onto the substrate arranging surface 14a of the carrier truck 11 shown in FIGS. 2A and 2B and the carrier truck 11 is conveyed into the chamber vessel. The inside of the chamber vessel is vacuum exhausted to $5 \times 10^{-5}$ Pa or less. After that, the argon gas and nitrogen are supplied into the chamber vessel, the pallet 14 is rotated while keeping the pressure in the chamber vessel at 0.10 Pa, and the Si target is reactive-sputtered, thereby forming the dielectric film 3 consisting of SiN onto one principal plane of the substrate 2. In this instance, a ratio of the flow rates of argon and nitrogen is equal to, for example, 4:1.

Subsequently, the argon gas is supplied into the chamber vessel, the pallet 14 is rotated while keeping the pressure in the chamber vessel at the predetermined pressure, and a Gd target, an Fe target, an FeCo alloy target, and an Al target are discharged, thereby forming the displacement layer 4 consisting of GdFeCoAl onto the dielectric film 3.

Subsequently, by discharging each target of Tb, Fe, FeCo alloy, and Al and executing sputtering, the control layer 5 of about 3 nm consisting of TbFeCoAl is formed on the displacement layer 4.

Processing conditions in the sputtering process are shown below.

Gas pressure: 0.06 Pa
(gas flow rate: 60 sccm, numerical aperture of exhaust valve: 100%)
Gas type: argon gas
Discharge power (inputted electric power): Tb target 75 W, Fe target 180 W, FeCo alloy target 60 W, and Al target 60 W
Bias voltage to the substrate: 0V
Density distribution of the elements, in the magnetic layer, constructing the magnetic layer: uniform
Distance between the substrate and the target: 150 mm
Rotational speed of the pallet: 1.3 rps (80 rpm)

Subsequently, the processing conditions in the sputtering process are changed and each target of Tb, Fe, FeCo alloy, and Al is discharged and sputtering is executed, thereby forming the switching layer 6 of about 10 nm consisting of TbFeCoAl onto the control layer 5.

Processing conditions in the sputtering process are shown below.

Gas pressure: 0.34 Pa
(gas flow rate: 100 sccm, numerical aperture of exhaust valve: 45%)
Gas type: argon gas
Discharge power (inputted electric power): Tb target 75 W, Fe target 180 W, FeCo alloy target 60 W, and Al target 60 W
Bias voltage to the substrate: 0V
Density distribution of the elements, in the magnetic layer, constructing the magnetic layer: uniform
Distance between the substrate and the target: 150 mm
Rotational speed of the pallet: 1.3 rps (80 rpm)

Subsequently, the argon gas is supplied into the chamber vessel, the pallet 14 is rotated while keeping the pressure in the chamber vessel at the predetermined pressure, and the Tb target, Fe target, and FeCo alloy target are discharged, thereby forming the memory layer 7 consisting of TbFeCo onto the switching layer 6.

Subsequently, the argon gas and nitrogen are supplied into the chamber vessel, the pallet 14 is rotated while keeping the pressure in the chamber vessel at the predetermined pressure, and Si is reactive-sputtered, thereby forming the protective film 8 consisting of SiN onto one principal plane of the substrate 2.

Subsequently, the inventor forms a magnetooptic disk (Comparison Example 1) (Comparison Example 2) in which the control layer is omitted and a magnetooptic disk having the control layer 5 and the switching layer 6 in which their component elements are different. Reproducing power dependencies of jitter values of the magnetooptic disk 1 according to the embodiment of the invention, the magnetooptic disk of Comparison Example 1, and the magnetooptic disk of Comparison Example 2 are measured and compared.

Figure 5:
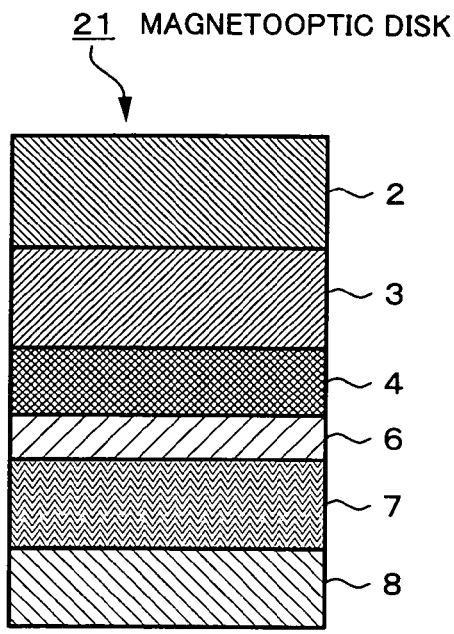
FIG. 5 is a cross sectional view showing a construction of a magnetooptic disk of first Comparison Example.

FIG. 5 is a cross sectional view showing a construction of a magnetooptic disk 21 of Comparison Example 1. The magnetooptic disk 21 is a magnetooptic disk of what is called a Domain Wall Displacement Detection system. In the magnetooptic disk 21 shown in FIG. 5, the portions corresponding to those of the magnetooptic disk 1 shown in FIG. 1 are designated by the same reference numerals and their description is omitted. As shown in FIG. 5, the magnetooptic disk 21 of Comparison Example 1 has a construction in which the control layer 5 of the magnetooptic disk 1 according to the embodiment is omitted.

Subsequently, a manufacturing method of the magnetooptic disk 21 of Comparison Example 1 will be shown.

First, the dielectric film 3 and the displacement layer 4 are formed on one principal plane of the substrate 2 in a manner similar to the manufacturing method of the magnetooptic disk 1 according to the embodiment.

Subsequently, the switching layer 6 of about 10 nm consisting of TbFeCoAl is formed onto the displacement layer 4 by discharging each target of Tb, Fe, FeCo alloy, and Al and executing sputtering.

Processing conditions in the sputtering process are shown below.
Gas pressure: 0.06 Pa
(gas flow rate: 60 sccm, numerical aperture of exhaust valve: 100%)
Gas type: argon gas
Discharge power (inputted electric power): Tb target 75 W, Fe target 180 W, FeCo alloy target 60 W, and Al target 90 W
Bias voltage to the substrate: 0V
Density distribution of the elements, in the magnetic layer, constructing the magnetic layer: uniform
Distance between the substrate and the target: 150 mm
Rotational speed of the pallet: 1.3 rps (80 rpm)

Since the subsequent manufacturing method of the magnetooptic disk 21 of Comparison Example 1 is similar to that of the magnetooptic disk 1 according to the embodiment, its explanation is omitted here.

Figure 6:
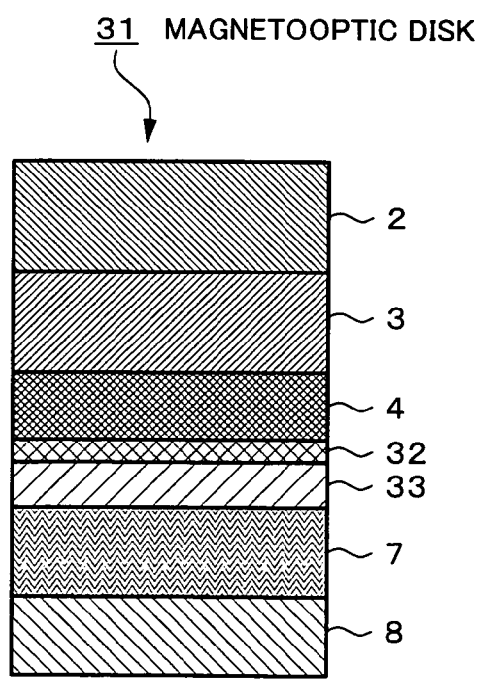
FIG. 6 is a cross sectional view showing a construction of a magnetooptic disk of second Comparison Example.

FIG. 6 is a cross sectional view showing a construction of a magnetooptic disk 31 of Comparison Example 2. The magnetooptic disk 31 is a magnetooptic disk of what is called a Domain Wall Displacement Detection system. In the magnetooptic disk 31 shown in FIG. 5, the portions corresponding to those of the magnetooptic disk 1 shown in FIG. 1 are designated by the same reference numerals and their description is omitted. In the magnetooptic disk 1 according to the embodiment mentioned above, the control layer 5 and the switching layer 6 are made of the same component elements. In the magnetooptic disk 31 of Comparison Example 2, however, a control layer 32 and a switching layer 33 are made of different component elements. Specifically speaking, the control layer 32 consists of TbFeCo and the switching layer 33 consists of TbFeCoAl.

Subsequently, a manufacturing method of the magnetooptic disk 31 of Comparison Example 2 will be shown.

First, the dielectric film 3 and the displacement layer 4 are formed on one principal plane of the substrate 2 in a manner similar to the manufacturing method of the magnetooptic disk 1 according to the embodiment.

Subsequently, the control layer 32 of about 3 nm consisting of TbFeCo is formed onto the displacement layer 4 by discharging each target of Tb, Fe, and FeCo alloy and executing sputtering.

Processing conditions in the sputtering process are shown below.
Gas pressure: 0.06 Pa
(gas flow rate: 60 sccm, numerical aperture of exhaust valve: 100%)
Gas type: argon gas
Discharge power (inputted electric power): Tb target 75 W, Fe target 180 W, and FeCo alloy target 60 W
Bias voltage to the substrate: 0V
Density distribution of the elements, in the magnetic layer, constructing the magnetic layer: uniform
Distance between the substrate and the target: 150 mm
Rotational speed of the pallet: 1.3 rps (80 rpm)

Subsequently, the processing conditions in the sputtering process are changed and each target of Tb, Fe, FeCo alloy, and Al is discharged and sputtered, thereby forming the switching layer 33 of about 10 nm consisting of TbFeCoAl onto the control layer 32.

Processing conditions in the sputtering process are shown below.
Gas pressure: 0.06 Pa
(gas flow rate: 60 sccm, numerical aperture of exhaust valve: 100%)
Gas type: argon gas
Discharge power (inputted electric power): Tb target 75 W, Fe target 180 W, FeCo alloy target 60 W, and Al target 90 W
Bias voltage to the substrate: 0V
Density distribution of the elements, in the magnetic layer, constructing the magnetic layer: uniform
Distance between the substrate and the target: 150 mm
Rotational speed of the pallet: 1.3 rps (80 rpm)

Since the other manufacturing method 31 of the magnetooptic disk of Comparison Example 2 is similar to that of the magnetooptic disk according to the embodiment, its explanation is omitted here.

Subsequently, reproducing power dependencies of jitter values of the magnetooptic disk 1, the magnetooptic disk 21, and the magnetooptic disk 31 are measured.

In the case of the magnetooptic disk 21 of Comparison Example 1, since the control layer 5 is not provided, what is called a ghost signal is generated and a distortion is caused in a signal waveform. Therefore, in the magnetooptic disk 21 of Comparison Example 1, the good jitter values cannot be obtained.

On the other hand, in the cases of the magnetooptic disk 1 according to the embodiment and the magnetooptic disk 31 of Comparison Example 2, the good jitter values can be obtained. Signal waveforms obtained from the magnetooptic disk 1 according to the embodiment and the magnetooptic disk 31 of Comparison Example 2 are almost similar.

That is, even if the method whereby the control layer 32 and the switching layer 33 having the different material compositions are properly and individually formed by the sputtering using the different targets like a manufacturing method of the magnetooptic disk 31 of Comparison Example 2 is not used, by changing only the gas pressure upon sputtering using the same targets, the same discharge power, and the same chamber vessel like a manufacturing method by the magnetooptic disk 1 according to the embodiment, the control layer 5 and the switching layer 6 are properly and individually formed and the magnetooptic disk of good signal characteristics can be manufactured.

According to the embodiment, the following advantages can be obtained.

By changing the processing conditions at the time of the sputtering process, it is possible to properly and individually form the magnetic layers of at least two layers in which the control layer 5 and the switching layer 6 which the magnetooptic disk 1 has are formed onto one principal plane of the substrate 2.

Subsequently, another embodiment of the invention will be described. The example in which the magnetic layers are laminated onto one principal plane of the substrate by the simultaneous sputtering using a plurality of targets has been shown in the foregoing embodiment. In another embodiment of the invention, an example in which magnetic layers are laminated onto one principal plane of the substrate by a single wafer type sputtering apparatus using an alloy target will be explained.

Since a construction of a magnetooptic disk according to another embodiment of the invention is similar to that of the foregoing embodiment, its explanation is omitted. A manufacturing method of the magnetooptic disk according to another embodiment of the invention will be described hereinbelow with reference to FIG. 1 used in the explanation of the construction of the embodiment.

First, the substrate 2 is conveyed into a chamber vessel in which an Si target has been set. The inside of the chamber vessel is vacuum exhausted to a predetermined pressure. After that, the argon gas and nitrogen are supplied into the chamber vessel and the Si target is reactive-sputtered while keeping a pressure in the chamber vessel at the predetermined pressure, thereby forming the dielectric film 3 consisting of SiN onto one principal plane of the substrate 2.

Subsequently, the substrate 2 on which the dielectric film 3 has been formed is conveyed into the chamber vessel in which an alloy target consisting of GdFeCoAl has been set. The inside of the chamber vessel is vacuum exhausted to a predetermined pressure. After that, the argon gas is supplied into the chamber vessel, and the target is discharged while keeping the pressure in the chamber vessel at the predetermined pressure, thereby forming the displacement layer 4 consisting of GdFeCoAl onto the dielectric film 3.

Subsequently, the substrate 2 on which the displacement layer 4 has been formed is conveyed into the chamber vessel in which the alloy target consisting of TbFeCoAl has been set. The inside of the chamber vessel is vacuum exhausted to a predetermined pressure. After that, the argon gas is supplied into the chamber vessel and the target is discharged while keeping the pressure in the chamber vessel at the predetermined pressure, thereby forming the control layer 5 of about 3 nm consisting of TbFeCoAl onto the displacement layer 4.

Processing conditions in the sputtering process are shown below.

Gas pressure: 0.06 Pa
(gas flow rate: 60 sccm, numerical aperture of exhaust valve: 100%)
Gas type: argon gas
Bias voltage to the substrate: 0V
Density distribution of the elements, in the magnetic layer, constructing the magnetic layer: uniform
Distance between the substrate and the target: 150 mm Subsequently, the processing conditions in the sputtering process are changed, the alloy target of TbFeCoAl is discharged, and the sputtering is executed, thereby forming the switching layer 6 of about 10 nm consisting of TbFeCoAl onto the control layer 5.

Processing conditions in the sputtering process are shown below.

Gas pressure: 0.34 Pa
(gas flow rate: 100 sccm, numerical aperture of exhaust valve: 45%)
Gas type: argon gas
Bias voltage to the substrate: 0V
Density distribution of the elements, in the magnetic layer, constructing the magnetic layer: uniform
Distance between the substrate and the target: 150 mm Subsequently, the substrate 2 on which the dielectric film 3 has been formed is conveyed into the chamber vessel in which an alloy target consisting of TbFeCo has been set. The inside of the chamber vessel is vacuum exhausted to a predetermined pressure. After that, the argon gas is supplied into the chamber vessel and the target is discharged while keeping the pressure in the chamber vessel at the predetermined pressure, thereby forming the memory layer 7 consisting of TbFeCo onto the switching layer 6.

Subsequently, the substrate 2 on which the memory layer 7 has been formed is conveyed into the chamber vessel in which the Si target has been set. The inside of the chamber vessel is vacuum exhausted to a predetermined pressure. After that, the argon gas and nitrogen are supplied into the chamber vessel and Si is reactive-sputtered while keeping the pressure in the chamber vessel at the predetermined pressure, thereby forming the protective film 8 consisting of SiN onto one principal plane of the substrate.

According to another embodiment, the following advantages can be obtained.

When the control layer 5 and the switching layer 6 which the magnetooptic disk 1 has are formed by sputtering the same alloy target in the same chamber vessel, since the gas pressure at the time of the sputtering process is selected in accordance with the element composition ratio and/or the magnetic characteristics of each of the control layer 5 and the switching layer 6, the magnetic layers can be properly and individually formed merely by changing the processing conditions at the time of the sputtering process. Therefore, since the number of chamber vessels can be reduced, the manufacturing apparatus of the magnetooptic disk 1 having the magnetic multilayer film can be simplified and miniaturized. Material costs and tact time of the magnetooptic disk 1 having the magnetic multilayer film can be reduced.

Although the embodiment of the invention has specifically been described above, the invention is not limited to the foregoing embodiment but various modifications based on the technical idea of the invention are possible.

For example, the numerical values mentioned in the foregoing embodiments are merely shown as examples and numerical values different from them can be used as necessary.

In the foregoing embodiment, the example in which when the control layer 5 and the switching layer 6 which the magnetooptic disk 1 has are formed by sputtering the same target 13 in the same chamber layer, the gas pressure at the time of the sputtering process is changed in accordance with the element composition ratio and/or the magnetic characteristics of each of the control layer 5 and the switching layer 6 has been shown. However, the gas pressure, the gas flow rate, the gas type, the electric power inputted to the target, the bias voltage to the substrate, the density distribution of the elements, in the magnetic layer, constructing the magnetic layer, the distance between the substrate and the material target, and the rotational speed of the pallet (rotational period of the pallet 14) at the time of forming the magnetic layer by sputtering can be also changed.

In another embodiment mentioned above, the example in which when the control layer 5 and the switching layer 6 which the magnetooptic disk 1 has are formed by sputtering the same target 13 in the same chamber layer, the gas pressure at the time of the sputtering process is changed in accordance with the element composition ratio and/or the magnetic characteristics of each of the control layer 5 and the switching layer 6 has been shown. However, the gas pressure, the gas flow rate, the gas type, the electric power inputted to the target, the bias voltage to the substrate, the density distribution of the elements, in the magnetic layer, constructing the magnetic layer, and the distance between the substrate and the material target at the time of forming the magnetic layer by sputtering can be also changed.

Although the example in which the invention is applied to the magnetooptic disk of the Domain Wall Displacement Detection system has been shown in the embodiment and another embodiment mentioned above, the invention is not limited to such an example. For instance, the invention can be also applied to a magnetooptic disk of an MAMMOS (Magnetically Amplified MO System) system or the like.

Although the example in which the displacement layer 4, control layer 5, switching layer 6, and memory layer 7 are formed by using the alloy target consisting of GdFeCoAl, the alloy target consisting of TbFeCoAl, the alloy target consisting of TbFeCoAl, and the alloy target consisting of TbFeCo, respectively has been shown in another embodiment mentioned above, those magnetic layers can be also formed by the simultaneous sputtering.

For example, in a chamber vessel in which the Gd target, Fe target, FeCo target, and Al target are provided, the displacement layer 4 can be formed by simultaneously sputtering those targets.

In a chamber vessel in which the Tb target, Fe target, FeCo target, and Al target are provided, the control layer 5 and the switching layer 6 can be also formed by simultaneously sputtering those targets.

In a chamber vessel in which the Tb target, Fe target, and FeCo target are provided, the memory layer 7 can be also formed by simultaneously sputtering those targets.

As described above, according to the invention, the number of vacuum vessels and the number of targets can be reduced. Therefore, the manufacturing facilities of the magneto-optical recording medium can be simplified and miniaturized. The manufacturing costs and the tact time of the magneto-optical recording medium can be reduced.

The invention claimed is:

1. A manufacturing method for a magneto-optical recording medium comprising a displacement layer, a control layer, a switching layer, and a memory layer, laminated over a substrate by sputtering, comprising the steps of:
    forming at least said control layer and said switching layer by sputtering a same target in a same vacuum vessel; and
    altering one or more processing conditions for a sputtering process that provides a different element composition ratio and magnetic characteristics for each of said control layer and switching layer, and
    wherein said processing conditions include one or more of: a gas flow rate, a numerical aperture of an exhaust port, a gas type, a bias voltage to said substrate, and a distance between said substrate and said target, and
    wherein said same target comprises a plurality of targets and said plurality of targets consist of different component elements, and
    wherein said plurality of targets are alternately and periodically sputtered.

2. The manufacturing method for a magneto-optical recording medium as set forth in claim 1, wherein said plurality of targets are alternately and periodically sputtered such that at no point are more than two of said targets being sputtered.

3. The manufacturing method for a magneto-optical recording medium as set forth in claim 1, wherein said plurality of targets are alternately and periodically sputtered such that at no point are more than one of said targets being sputtered.

4. The manufacturing method for a magneto-optical recording medium as set forth in claim 3, wherein said plurality of targets are alternately and periodically sputtered a plurality of times in order to form thin layers of each target such that the resultant plurality of thin layers is functionally equivalent to a single magnetic layer in which all of the plurality of targets are simultaneously sputtered.

5. The manufacturing method for a magneto-optical recording medium as set forth in claim 1, wherein said plurality of targets are alternately and periodically sputtered a plurality of times in order to form thin layers of each target such that the resultant plurality of thin layers is functionally equivalent to a single magnetic layer in which all of the plurality of targets are simultaneously sputtered. target is also sputtered.

6. The manufacturing method for a magneto-optical recording medium as set forth in claim 1, where said same plurality of targets include separate Al, Tb, Fe, and FeCo alloy targets.

7. A manufacturing method for a magneto-optical recording medium comprising a displacement layer, a control layer, a switching layer, and a memory layer, laminated over a substrate by sputtering, comprising the steps of:
    forming at least said control layer and said switching layer by sputtering a same target in a same vacuum vessel; and
    altering one or more processing conditions for a sputtering process that provides a different element composition ratio and magnetic characteristics for each of said control layer and switching layer, and
    wherein said processing conditions include at least a rotational speed of a pallet onto which the substrate is attached.

8. The manufacturing method for a magneto-optical recording medium as set forth in claim 7, where said same target is a system of separate Al, Tb, Fe, and FeCo alloy targets.

9. The manufacturing method for a magneto-optical recording medium as set forth in claim 7, where said same target is a single TbFeCoAl alloy target.

10. The manufacturing method for a magneto-optical recording medium as set forth in claim 7, where said same target is a system of separate Tb, Fe, and FeCo alloy targets, and wherein during the formation of said switching layer, an additional Al target is also sputtered.

11. A manufacturing method for a magneto-optical recording medium comprising a displacement layer, a control layer, a switching layer, and a memory layer, laminated over a substrate by sputtering, comprising the steps of:
    forming at least said control layer and said switching layer by sputtering a same target in a same vacuum vessel; and
    altering one or more processing conditions for a sputtering process that provides a different element composition ratio and magnetic characteristics for each of said control layer and switching layer, and
    wherein said processing conditions include one or more of: a numerical aperture of an exhaust port, a bias voltage applied to said substrate, a gas flow rate, a gas type, a bias voltage to said substrate, a rotational speed of a pallet onto which the substrate is attached, and a distance between said substrate and said target.

12. The manufacturing method for a magneto-optical recording medium as set forth in claim 11, where said same target is a system of separate Al, Tb, Fe, and FeCo alloy targets.

13. The manufacturing method for a magneto-optical recording medium as set forth in claim 11, where said same target is a single TbFeCoAl alloy target.

14. The manufacturing method for a magneto-optical recording medium as set forth in claim 11, where said same target is a system of separate Tb, Fe, and FeCo alloy targets, and wherein during the formation of said switching layer, an additional Al target is also sputtered.

15. The manufacturing method for a magneto-optical recording medium as set forth in claim 11, where said same plurality of targets include separate Tb, Fe, and FeCo alloy targets, and wherein during the formation of said switching layer, an additional Al target is also sputtered.

* * * * *